United States Patent
Cordell et al.

(10) Patent No.: US 11,082,560 B2
(45) Date of Patent: *Aug. 3, 2021

(54) CONFIGURATION FOR TRANSITIONING A COMMUNICATION FROM AN AUTOMATED SYSTEM TO A SIMULATED LIVE CUSTOMER AGENT

(71) Applicant: Language Line Services, Inc., Monterey, CA (US)

(72) Inventors: Jeffrey Cordell, Carmel, CA (US); James Boutcher, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/411,650

(22) Filed: May 14, 2019

(65) Prior Publication Data

US 2020/0366790 A1 Nov. 19, 2020

(51) Int. Cl.
*H04M 3/51* (2006.01)
*G06F 40/58* (2020.01)
*H04M 3/523* (2006.01)
*G06Q 30/00* (2012.01)
*G10L 15/00* (2013.01)

(52) U.S. Cl.
CPC .......... *H04M 3/5175* (2013.01); *G06F 40/58* (2020.01); *G06Q 30/016* (2013.01); *G06Q 30/0185* (2013.01); *G10L 15/005* (2013.01); *H04M 3/5191* (2013.01); *H04M 3/5235* (2013.01)

(58) Field of Classification Search
CPC ............. G06Q 30/016; G06Q 30/0185; G06Q 30/0282; G10L 15/005; H04M 3/51; H04M 3/5175; H04M 3/5183; H04M 3/5191; H04M 3/523; H04M 3/5235; H04M 2203/2061; H04M 2250/58; G06F 40/58
USPC ........ 379/201.01, 207.15, 265.09; 704/270.1
See application file for complete search history.

(56) References Cited

U.S. PATENT DOCUMENTS

| | | | |
|---|---|---|---|
| 2007/0147599 A1* | 6/2007 | Sharpe | H04M 3/5166 379/265.02 |
| 2008/0109208 A1* | 5/2008 | Curry | G09B 5/12 704/3 |
| 2008/0140422 A1* | 6/2008 | Hovestadt | G10L 15/26 704/275 |

(Continued)

*Primary Examiner* — Harry S Hong
(74) *Attorney, Agent, or Firm* — Patent Ingenuity, P.C.; Samuel K. Simpson

(57) ABSTRACT

A configuration is implemented to establish, with a processor, a customer care system based on a first human-spoken language. Further, the configuration receives, at an automated system, a request from a user through a dedicated communication channel for a service, the request being in a second human-spoken language. Moreover, the configuration determines, with the processor, an identity of the second human-spoken language based on the dedicated communication channel. The configuration also determines, with the processor, that the automated system is unable to fulfill the request. Additionally, the configuration transitions, with the processor, the request from the automated system to a simulated live agent engine that generates a simulated live agent session. The simulated live agent engine sends the request to a machine interpreter that translates the request into the first human-spoken language.

20 Claims, 9 Drawing Sheets

(56) References Cited

U.S. PATENT DOCUMENTS

| | | | | |
|---|---|---|---|---|
| 2016/0117593 | A1* | 4/2016 | London | G06F 40/58 |
| | | | | 706/11 |
| 2016/0299887 | A1* | 10/2016 | Cordell | G06F 16/3344 |
| 2017/0374198 | A1* | 12/2017 | de Silva | H04L 51/02 |
| 2019/0139430 | A1* | 5/2019 | Ghatage | G09B 7/02 |
| 2020/0012724 | A1* | 1/2020 | Kawatake | G10L 15/005 |
| 2020/0365147 | A1* | 11/2020 | Cordell | G06F 40/58 |
| 2020/0404094 | A1* | 12/2020 | Roderick | H04M 3/42221 |

* cited by examiner

US 11,082,560 B2

CONFIGURATION FOR TRANSITIONING A COMMUNICATION FROM AN AUTOMATED SYSTEM TO A SIMULATED LIVE CUSTOMER AGENT

BACKGROUND

1. Field

This disclosure generally relates to the field of language interpretation. More particularly, the disclosure relates to a computerized system that provides spoken-language interpretation via an audio-based device.

2. General Background

A variety of service providers (e.g., banks, insurance companies, etc.) typically allow a user to obtain account information by placing a telephone call to a service center associated with the service provider, and accessing an automated system (e.g., an interactive voice response system ("IVR")).

However, conventional automated systems have been typically developed for operational use with one particular human spoken-language (e.g., English). For instance, a user speaking a language other than English, which is referred to herein as a limited English proficiency user ("LEP"), may call a service provider whose automated system is only capable of providing a service in English.

Even though the LEP may not be fluent in English, he or she may still have some ability to partially navigate through the English-based IVR. For example, although some LEPs may understand a few keywords, such as balance, and be able to press numbers on a keypad to obtain a balance in English, others may not. Further, many LEPs may not be able to understand services that are not rudimentary, which are offered by the service provider via the English-based IVR.

Thus, conventional automated systems are not utilized in an optimal manner by service providers that provide services to users speaking a variety of different human-spoken languages.

SUMMARY

A configuration is implemented to establish, with a processor, a customer care system based on a first human-spoken language. Further, the configuration receives, at an automated system, a request from a user through a dedicated communication channel for a service. The request is in a second human-spoken language. Moreover, the configuration determines, with the processor, an identity of the second human-spoken language based on the dedicated communication channel. The configuration also determines, with the processor, that the automated system is unable to fulfill the request. Additionally, the configuration transitions, with the processor, the request from the automated system to a simulated live agent engine that generates a simulated live agent session. The simulated live agent engine sends the request to a machine interpreter that translates the request into the first human-spoken language. Further, the machine interpreter sends the translated request to a computing device, operable by a human customer agent, that processes the request to provide the service in the first human-spoken language. The machine interpreter translates the service into the second human-spoken language. In addition, the simulated live agent engine delivers the service in the second human-spoken language to the user.

In one embodiment, the configuration is implemented via computer executable instructions that are stored on a computer readable device. In another embodiment, the configuration is implemented as a process. In yet another embodiment, the configuration may be implemented via a system that utilizes the processor, which may be specialized for simulating a live agent session and/or transitioning from a simulated live agent session to a human language interpreter.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A configuration is provided for transitioning from an automated system to a simulated live agent system. For example, the configuration may determine that the services provided by the automated system, which rely on accessible data from an automated system database, are not adequate to meet the particular user's request. For instance, in contrast with requesting automated service data such as an insurance premium balance, a user may want information regarding an in-person appointment with an insurance agent; that appointment information may not be available in the automated system database that is accessible by the automated system.

Figure 1A:
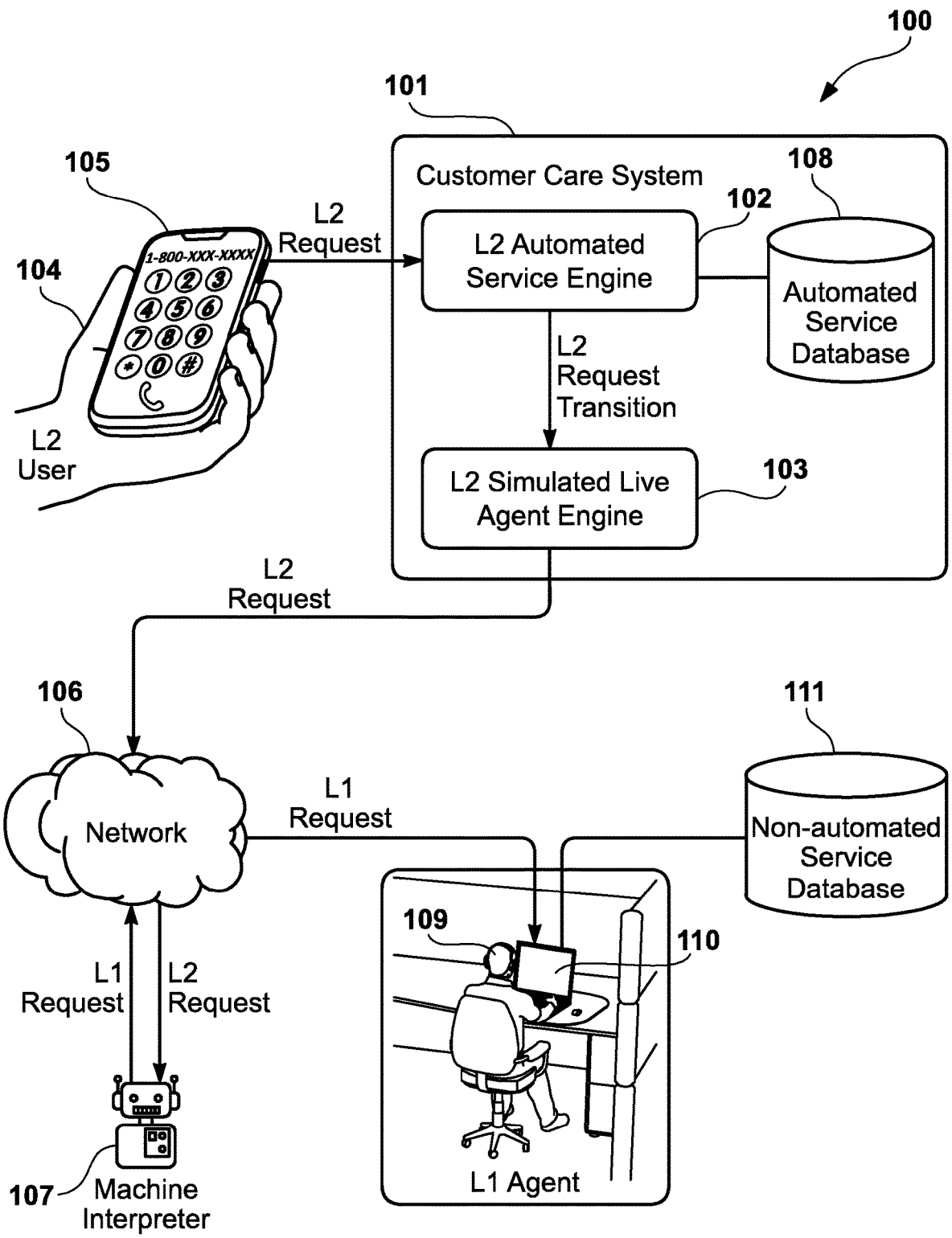
FIG. 1A illustrates the user utilizing a mobile computing device to place a telephone call to the customer care system, which corresponds to a service provider.
Figure 1B:
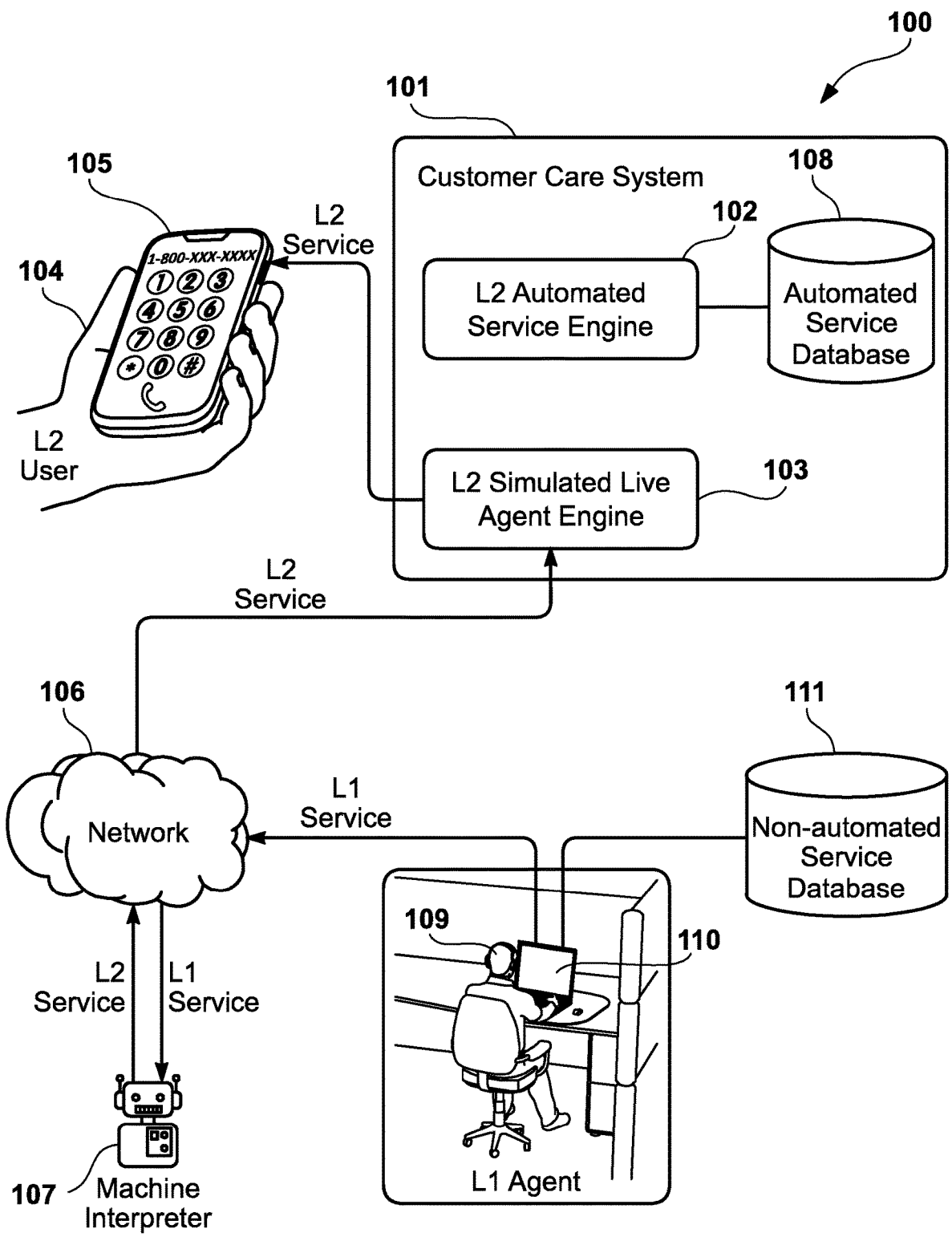
FIG. 1B illustrates the first language-speaking customer care agent processing the request in the first language.

FIGS. 1A and 1B illustrate an example of a sequence of events performed by a transition configuration 100 when a user 104 initially places a telephone call to a customer care system 101. In particular, FIG. 1A illustrates the user 104 utilizing a mobile computing device 105 (e.g., smartphone, tablet device, etc.) to place a telephone call to the customer care system 101, which corresponds to a service provider. (Although a mobile computing device 105 is illustrated, a stand-alone telecommunication device (e.g., landline telephone) may be used instead.) As an example, the user 104 may be a customer, and the service provider associated with the customer care system 101 may be an insurance company. The user 104 may be calling the customer care system 101 to obtain balance information for his or her insurance policy.

Moreover, although the customer care system 101 may be based in a first language (e.g., English), the customer care system 101 may provide services based in a second language (e.g., Polish) spoken by the user 104. For instance, the customer care system 101 may have a second language automated service engine 102 that is able to access, directly or indirectly, an automated service database 108, which stores non-human necessitated data (e.g., user account data such as balance information). In one embodiment, the second language automated service engine 102 is a simulated IVR in the second language that is based on an IVR in the first language. In other words, communications may be interpreted/translated between the second language automated service engine 102 and the first language IVR (e.g., via a machine interpreter) to automatically obtain non-human necessitated data. The second language automated service engine 102 may then interact with the user 104 in the second language based on the data that the second language automated service engine 102 obtained from the automated service database 108, via the first language IVR. In another embodiment, the second language automated service engine 102 may have functionality built-in to the platform of the customer care system 101, which allows the second language automated service engine 102 to access the automated service database 108 without the need to simulate a second language IVR. For example, the customer care system 101 may be based on the second language, or may be based on multiple languages that include the second language.

Yet, providing non-human necessitated data may not suffice to meet the objective of the user 104 that speaks the second language; upon such determination (e.g., from a user input, or lack of user input within a predetermined time period, received from the user 104 via the mobile computing device 105), the second language automated service engine 102 may transition the communication to a second language live agent engine 103. Given that the customer care system 101 may be based in the first language (e.g., English), the customer care system 101 may not have a customer care agent that speaks the second language (e.g., Polish). Accordingly, the second language simulated live agent engine 103 generates a simulation in which the user 104 is presented with a live customer agent interaction, which is in actuality based on a first language speaking customer agent 109. The second language simulated live agent engine 103 may interact with a machine interpreter 107, via a network 106, to interpret/translate the communication received by the second language simulated live agent engine 103 into the first language. Further, the interpreted/translated communication may be routed to the customer care agent 109, who speaks the first language.

In one embodiment, the second language spoken by the user 104 is identified by the second language automated service engine 102, or a routing engine, as a result of the user calling a dedicated communication channel, such as a dedicated telephone number (e.g., a one eight hundred telephone number). Accordingly, the customer care system 101 may determine which simulated live agent engine (i.e., corresponding to which language) should be utilized to provide the service to the user 104. Alternatively, the same second language simulated live agent engine 103 may adapt to the identified second language to provide a service in that second language.

After identifying the second language, the customer care system 101 may process a request received in the second language from the mobile computing device 105 of the user 104, as illustrated in FIG. 1A. The second language automated service engine 102 may determine that the request does not fit into the categories of those corresponding to data that may be retrieved from the automated service database 108. For example, the user 104 may provide a voice request for an appointment confirmation, which does not correlate to user account information that may be stored by the automated service database 108. As another example, the user 104 may provide an input requesting a representative rather than selecting from a menu of non-necessitated human data presented to the user 104 from the second language automated service engine 102.

Subsequently, the second language automated service engine 102, or a routing engine, transitions the request to the second language simulated live agent engine 103. Rather than expending resources on additional customer care agents that speak languages other than the first language, the service provider may implement a technological-based solution by simulating a live customer agent session in the second language, but based on interactions with the first language-speaking customer care agent 109 using a computing device 110. The second language simulated live agent engine 103 routes the request in the second language, via the network 106, to a machine interpreter 107, which interprets/translates the request into the first language for the first language-speaking customer care agent 109.

Further, FIG. 1B illustrates the first language-speaking customer care agent 109 processing the request in the first language. The first language-speaking customer care agent 109, who is human, is able to access a non-automated service database 111 that may contain data that is not readily accessible by the automated service database 108. For example, the first language-speaking customer care agent 109 may be able to access an appointment database for a physical location of an insurance provider. Moreover, the first language-speaking customer care agent 109 may be able to communicate with other customer care agents 109 to assist the second language-speaking user with an issue that necessitates a customized, rather than an automated, response. For example, the second language-speaking user may be having technical difficulties accessing his or her online account, and may need one or more human customer care agents to resolve that issue.

After processing the request in the first language, the customer care agent 109 may send the service in the first language to the machine interpreter 107 to interpret/translate the service into the second language. Moreover, the machine interpreter 107 may provide the interpreted/translated service to the second language simulated live agent engine 103, which may then present the service in the second language to the user 104, through the dedicated communication channel.

Although FIGS. 1A and 1B illustrate one workflow sequence, multiple workflow sequences may be utilized by the customer care system 101 to provide a service, such as a human necessitated service, to the user 104. For example, the user 104 speaking Polish may have to have several interactions with customer care agent 109 to resolve a technical issue. Nonetheless, from the perspective of the user 104, the customer care agent 109 appears to be speaking Polish, not English, during the simulated live agent session. Similarly, from the perspective of the customer care agent 109, the user 104 appears to be speaking English.

Figure 2A:
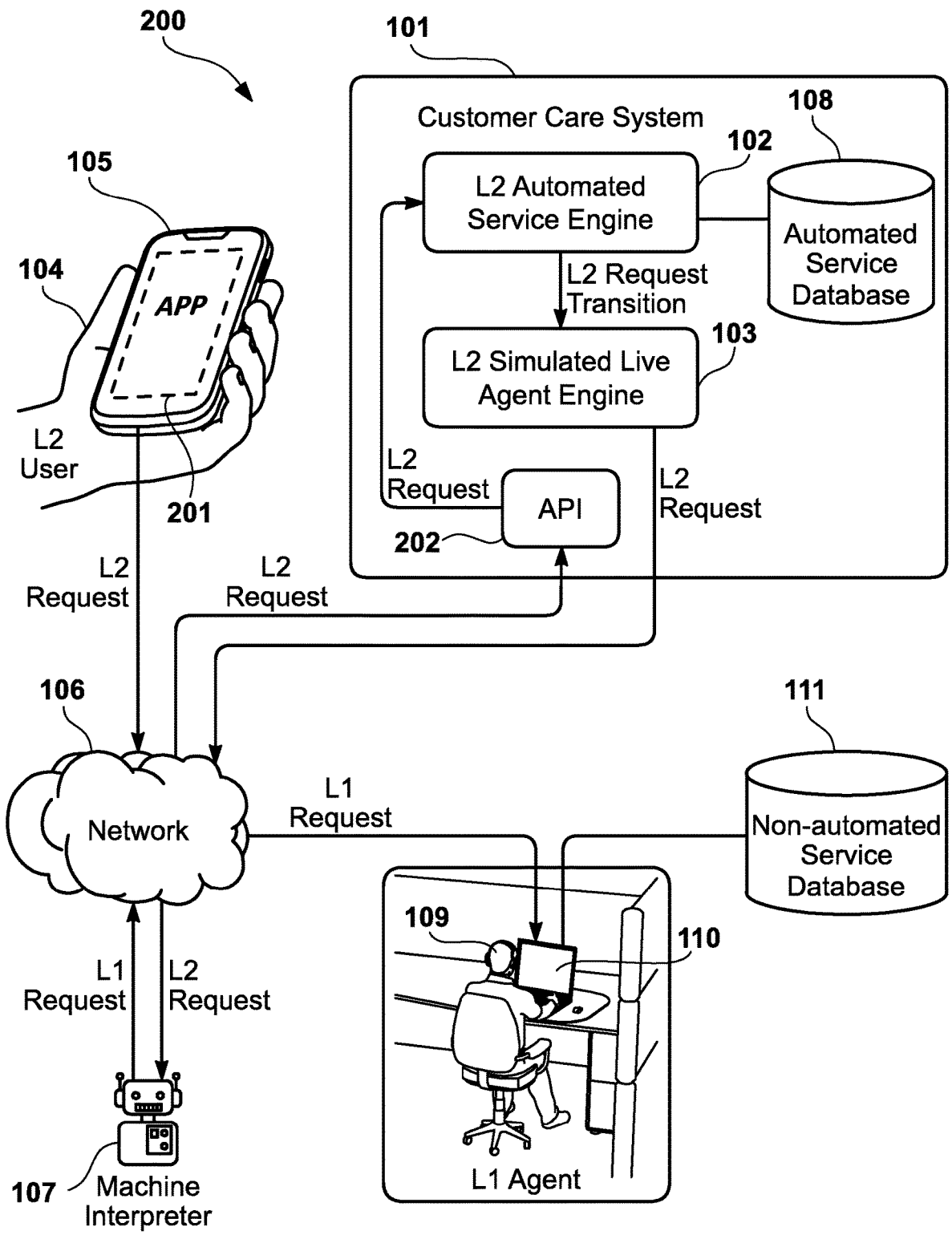
FIG. 2A illustrates the mobile computing device sending a request in the second language, but with the dedicated communication channel being the application programming interface ("API") rather than a dedicated telephone number.
Figure 2B:
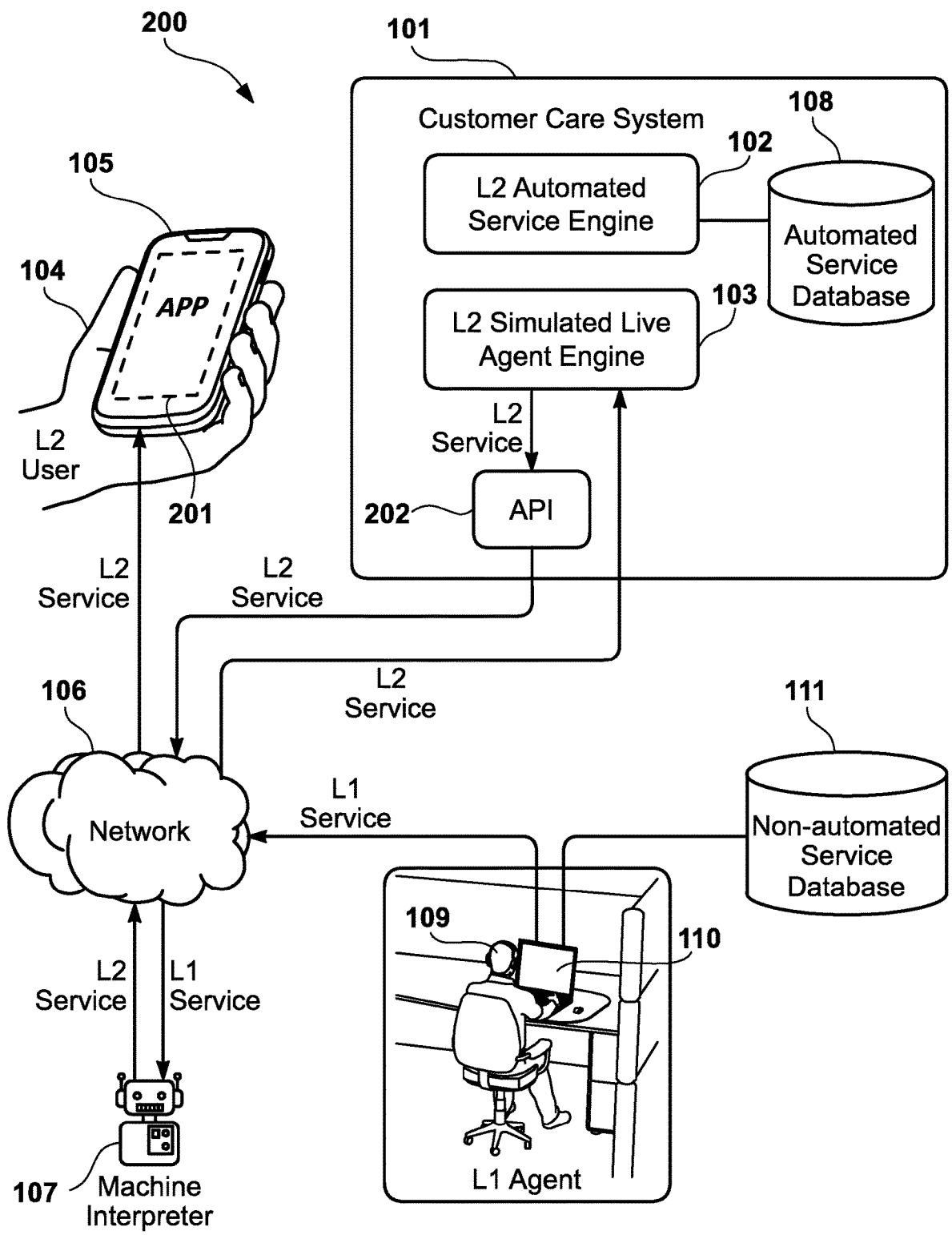
FIG. 2B illustrates the mobile computing device of the user receiving a service in the second language via the API.

Although the dedicated communication channel illustrated in FIGS. 1A and 1B is for a telephone number, alternative communication channels may be utilized instead. For example, FIGS. 2A and 2B illustrate the communication channel being provided via an API 202 of a transition configuration 200. In other words, the customer care system 101 may have built-in functionality via the API 202 that may be externally accessed via the mobile computing device 105 (e.g., smartphone) of the user 104. As a result, the user 104 may utilize a software application 201 residing on his or her mobile computing device 105 to communicate with the second language simulated live agent engine 103 via the API 202. For example, the API 202 may have one or more functions that may be invoked via function calls by the software application 201. In one embodiment, the mobile computing device 105 may communicate with the API 202 via the network 106. Accordingly, the user 104 may place a telephone call via telephony module residing on the mobile computing device 105 and/or via the software application 201 stored in the mobile computing device 105.

Accordingly, FIG. 2A illustrates the mobile computing device 105 sending a request in the second language, but with the dedicated communication channel being the API 202 rather than a dedicated telephone number. Furthermore, FIG. 2B illustrates the mobile computing device 105 of the user 104 receiving a service in the second language via the API 202.

Although many human necessitated requests may be processed by the simulated live agent engine 103 in conjunction with the machine interpreter 107 and the customer care agent 109, some human necessitated requests may be deemed by the service provider to be of such a high priority that it does not want to rely any inaccuracy that may result from a machine interpretation/translation. For example, the user 104 may place a phone call regarding fraudulent activity on his or her account; in such an instance, time may be of the essence for the service provider to take immediate action.

Figure 3A:
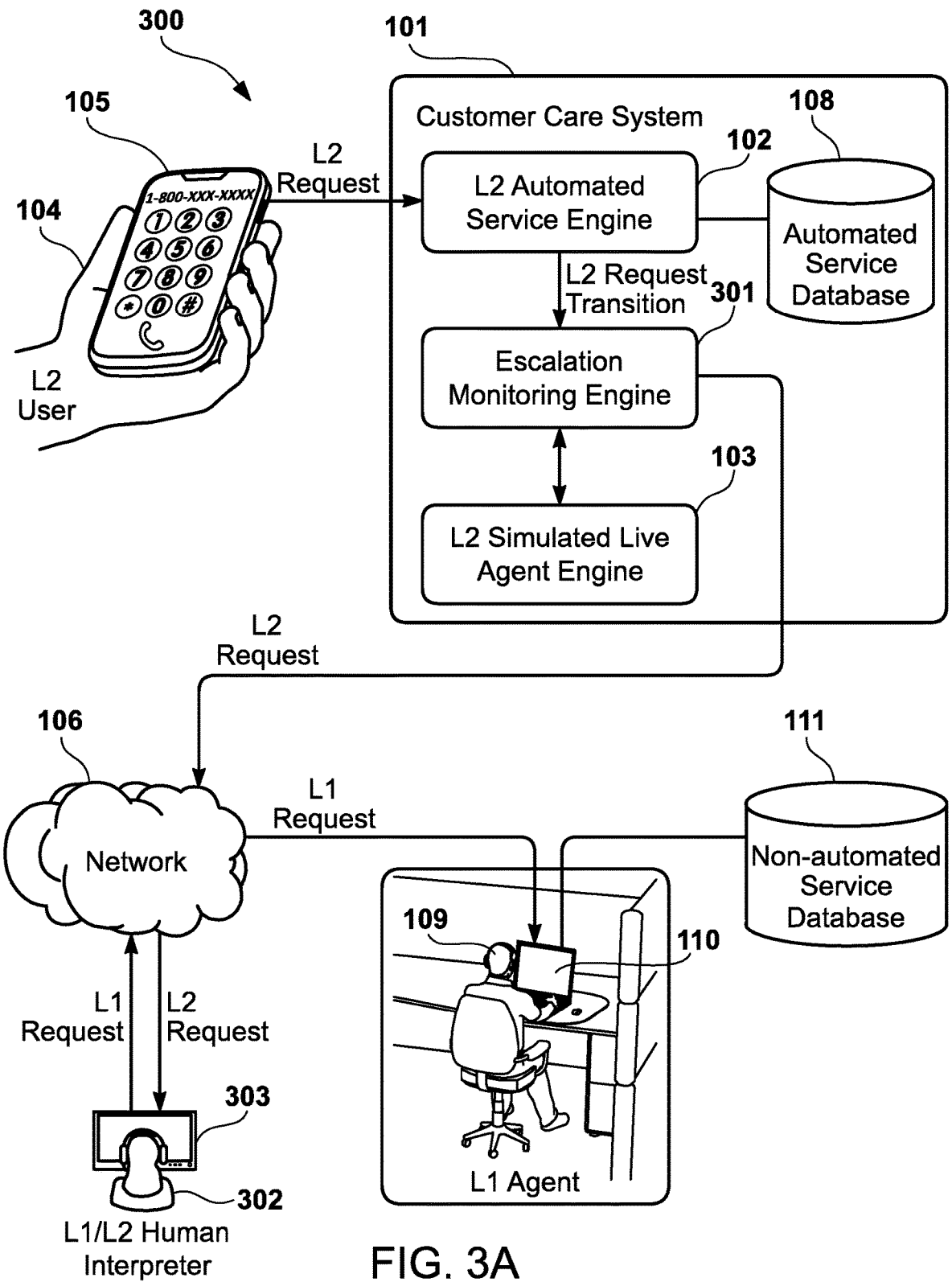
FIG. 3A illustrates the escalation monitoring engine, which monitors the request before it is received by the second language simulated live agent engine and transitions the request to the human language interpreter at a corresponding computing device.
Figure 3B:
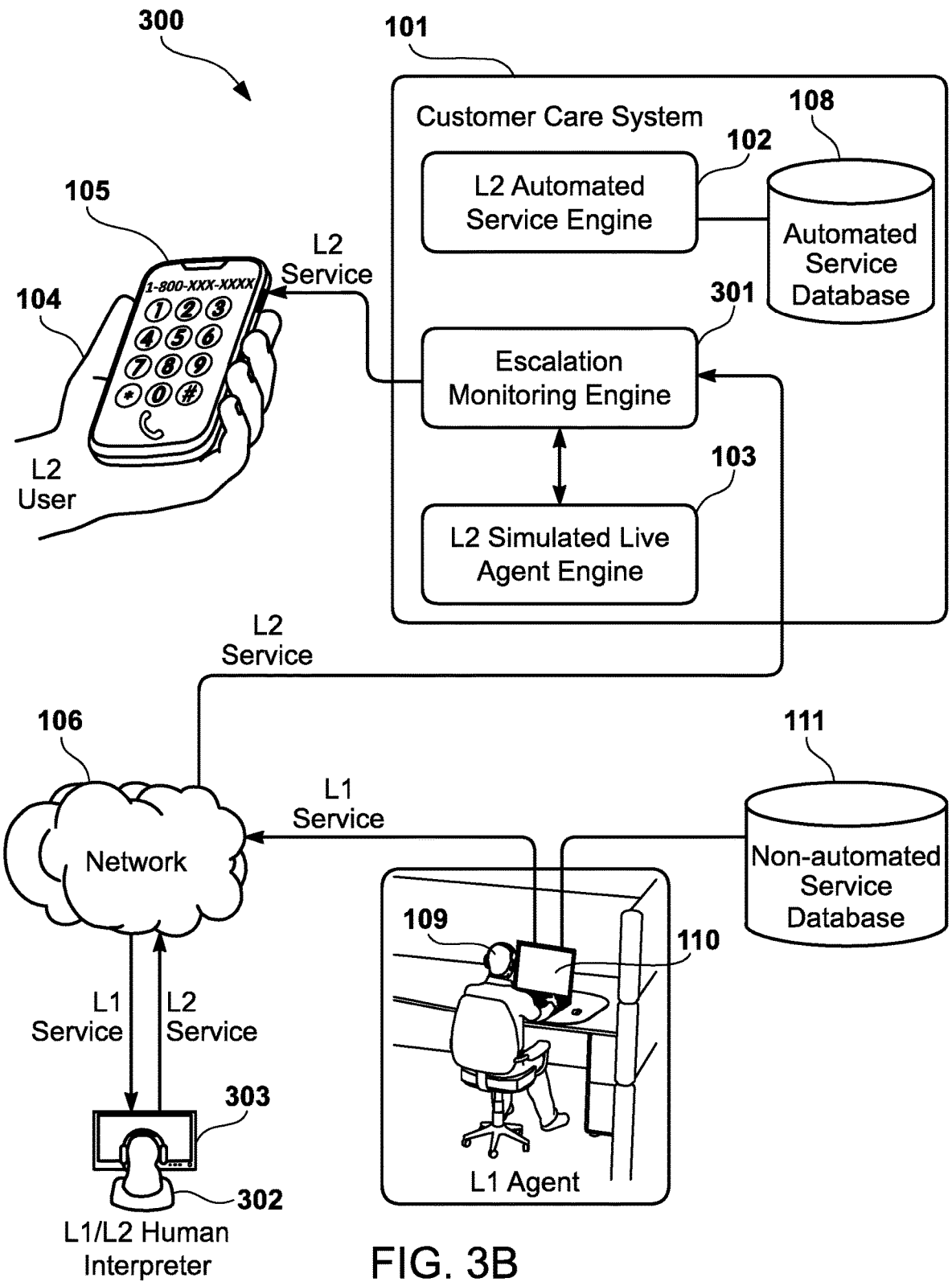
FIG. 3B illustrates the customer care agent providing the service in the first language, which is interpreted/translated by the language interpreter for delivery by the escalation monitoring engine to the user.

FIGS. 3A and 3B illustrate an escalation configuration 300 in which the customer care system 101 has an escalation monitoring engine 301 that monitors communications for possible escalation to a human language interpreter. As illustrated in FIG. 3A, the escalation monitoring engine 301 monitors the request before it is received by the second language simulated live agent engine 103 and transitions the request to the human language interpreter 302 at a corresponding computing device 303. For example, the user 104 may have provided a touch screen input or voice command indicating fraudulent activity on his or her account. Instead of allowing the second language simulated live agent engine 103 to even begin simulating a live agent interaction via the machine interpreter 107, the escalation monitoring module 301 re-routes the request in real-time, from the time of the fraudulent activity indication, to the human language interpreter 302 to translate/interpret the request for the customer care agent 109. In an alternative embodiment, the escalation monitoring module 301 allows the request to be initially routed to the second language simulated live agent engine 103 because the fraudulent activity indication was not received at the outset of the communication from the user 104. During monitoring of the interaction between the user 104 and the customer care agent 109 via the second language live agent engine 103, the escalation monitoring engine 301 may determine that one or more escalation criteria have been met. For example, the escalation monitoring engine 301 may monitor the communication for one or more keywords that are indicative of fraudulent activity. Upon determining that an escalation criterion has been met, the escalation monitoring engine 301 may then re-route, in real-time from the time of such determination, the communication to the human language interpreter 302, instead of the machine interpreter 107, for subsequent language interpretation/translation. Further, FIG. 3B illustrates the customer care agent 109 providing the service in the first language, which is interpreted/translated by the language interpreter 302 for delivery by the escalation monitoring engine 301 to the user 104. In other words, the machine interpreter 107, illustrated in FIGS. 1A and 1B, may not be involved in performing any interpretation/translation after escalation.

Figure 4:
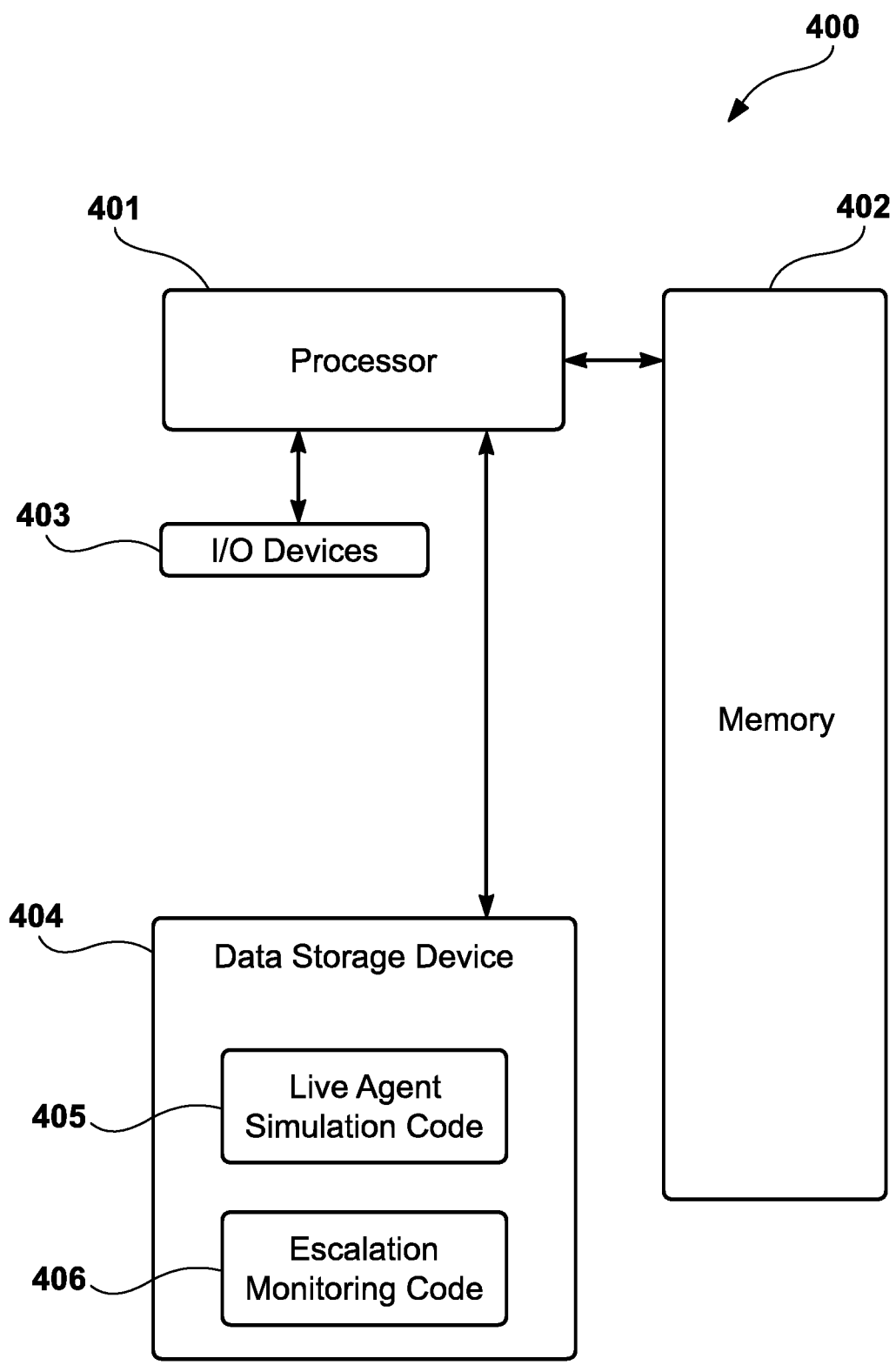
FIG. 4 illustrates a system configuration that may be used to implement the transition configuration illustrated in FIGS. 1A and 1B, the transition configuration illustrated in FIGS. 2A and 2B, or the escalation configuration illustrated in FIGS. 3A and 3B.

FIG. 4 illustrates a system configuration 400 that may be used to implement the transition configuration 100 illustrated in FIGS. 1A and 1B, the transition configuration 200 illustrated in FIGS. 2A and 2B, or the escalation configuration 300 illustrated in FIGS. 3A and 3B. The system configuration 400 has a processor 401 that is in operable communication with a memory device 402, one or more input/output ("I/O") devices 403, and a data storage device 404. Further, the processor 401 loads various code (e.g., live agent simulation code 405 and escalation monitoring code 406) from the data storage device 404 into the memory device 402.

The processor 301 may be a specialized processor that utilizes the live agent simulation code 405 to generate a second language simulated live agent session via the second language simulated live agent engine 103, as illustrated in FIGS. 1A-2B. Further, the processor 301 may be a specialized processor that utilizes the escalation monitoring code 406 to perform escalation monitoring via the escalation monitoring engine 301, as illustrated in FIGS. 3A and 3B.

Figure 5:
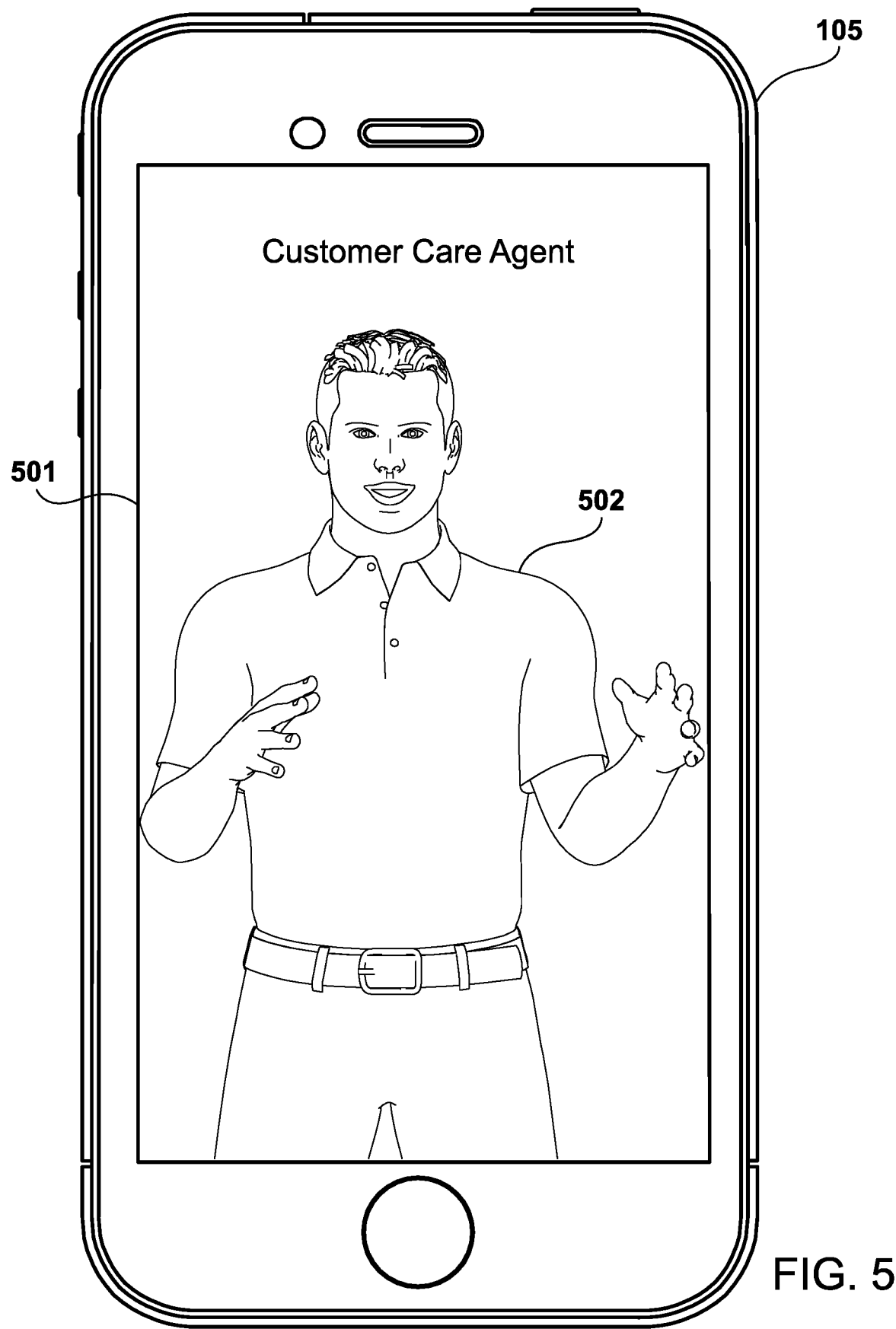
FIG. 5 illustrates the mobile computing device with a display screen that displays an avatar corresponding to the customer care agent.

Moreover, in one embodiment, imagery may be displayed on the mobile computing device 105 to correspond to the human customer care agent 109, who may base his or her service on the interpretation/translation received from the machine interpreter 107, illustrated in FIGS. 1A-2B, or the human language interpreter 301. The imagery may be manipulated in a variety of ways to correspond to the language uttered by a speaker, but as would be understood in the distinct language received by the other speaker. For example, FIG. 5 illustrates the mobile computing device 105 with a display screen 501 that displays an avatar 502 corresponding to the customer care agent 109. Although the customer care agent 109 may speak in English with certain lip movements, the avatar 502 is manipulated to have lip movements corresponding to the interpreted/translated words in Polish. As another example, certain gestures or phrases may be associated with certain phrases in English, but are visually displayed as would be understood by the user 104 as corresponding to the interpreted/translated language in Polish. (The imagery is not limited to the avatar 502; other imagery (e.g., pictures of customer care agents 109, service provider brand indicia, etc.) may be used instead.)

Figure 6:
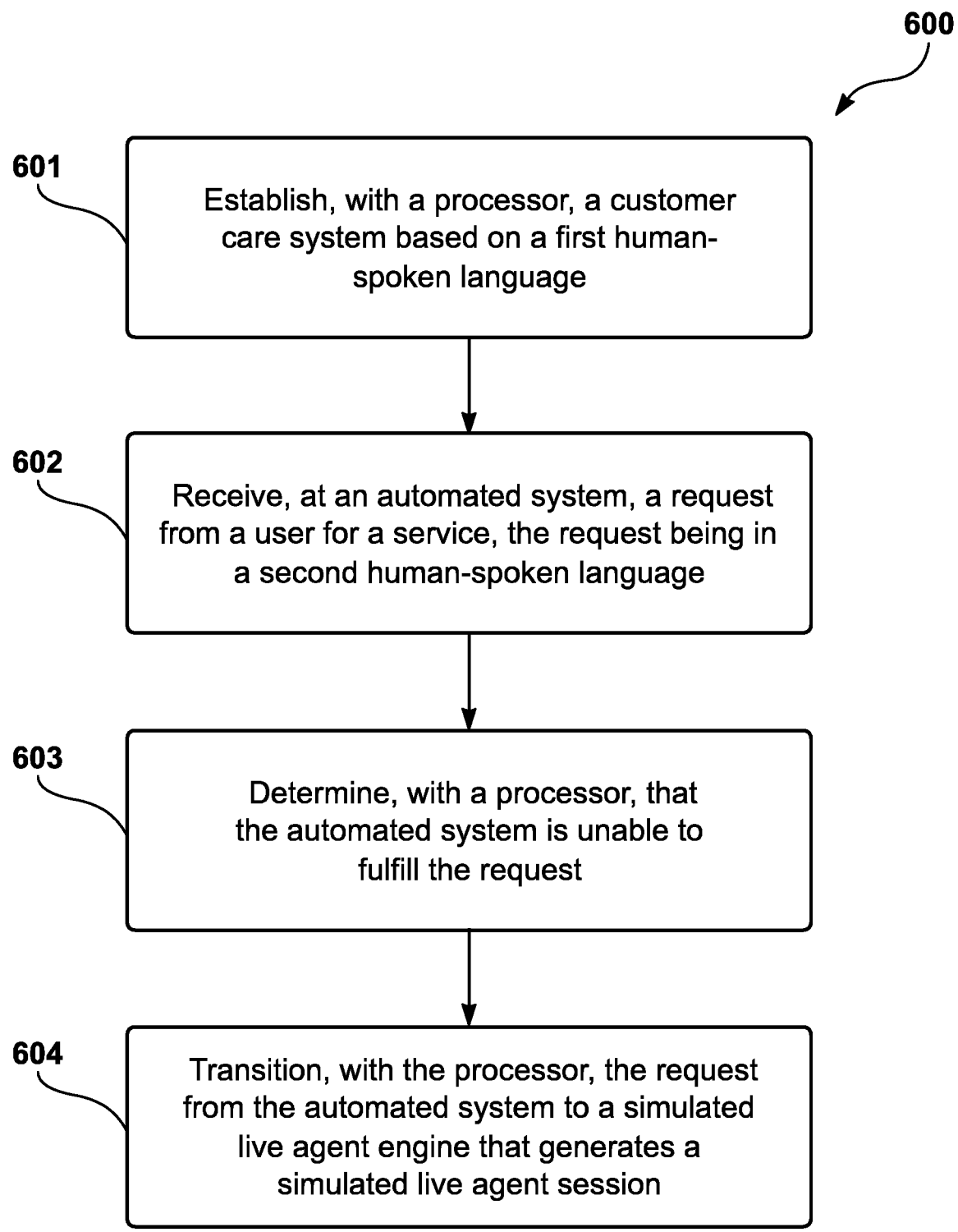
FIG. 6 illustrates a process that may be utilized by the transition configuration to transition a service request from an automated system to a simulated live agent session.

FIG. 6 illustrates a process 600 that may be utilized by the transition configuration 100 or 200 to transition a service request from an automated system to a simulated live agent session. At a process block 601, the process 600 establishes, with the processor 401 illustrated in FIG. 4, the customer care system 101 based on a first human-spoken language. Further, at a process block 602, the process 600 receives, at an automated system, a request from a user through a dedicated communication channel for a service. The request is in a second human-spoken language. Additionally, at a process block 603, the process 600 determines, with the processor 401, an identity of the second human-spoken language based on the dedicated communication channel. At a process block 604, the process 600 determines, with the processor 401, that the automated system is unable to fulfill the request. Finally, at a process block 605, the process 600 transitions, with the processor 401, the request from the automated system to a simulated live agent engine that generates a simulated live agent session. The simulated live agent engine sends the request to the machine interpreter 107 that translates the request into the first human-spoken language. The machine interpreter 107 sends the translated request to a computing device, operable by a human customer agent, that processes the request to provide the service in the first human-spoken language. The machine interpreter 107 translates the service into the second human-spoken language. The simulated live agent engine delivers the service in the second human-spoken language to the user. In one embodiment, the language interpretation service provided for herein may be implemented via a voice-based communication. In another embodiment, the language interpretation service provided for herein may be implemented via a text-based communication (e.g., a chat session). In yet another embodiment, the language interpretation service provided for herein may be implemented via an image-based communication (e.g., for sign language detection via image capture rather than audio capture). Finally, the language interpretation service may implement a combination of the foregoing types of communication.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a customer care computer system causes the customer care computer system to:

establish, with a processor, a first human-spoken language for the customer care computer system;

receive, at an automated system of the customer care computer system, a request from a user through a dedicated communication channel for a service, the request being in a second human-spoken language, the automated system being dependent on an automated service database;

determine, with the processor, an identity of the second human-spoken language based on the dedicated communication channel;

determine, with the processor, that the automated system is unable to fulfill the request; and transition, with the processor based on the automated system being unable to fulfill the request, the request from the automated system to a simulated live agent engine of the customer care computer system that generates a simulated live agent session independently of the automated service database, the simulated live agent engine sending the request to a machine interpreter that translates the request into the first human-spoken language, the machine interpreter sending the translated request to a computing device, operably by a human customer agent, that processes the request to provide the service in the first human-spoken language, the machine interpreter translating the service into the second human-spoken language, the simulated live agent engine delivering the service in the second human-spoken language to the user, the second human-spoken language being distinct from the first human-spoken language.

2. The computer program product of claim 1, wherein the customer care computer system is further caused to monitor the simulated live agent session for one or more escalation criteria.

3. The computer program product of claim 2, wherein the customer care computer system is further caused to transition the request to a human language interpreter upon at least one of the one or more escalation criteria being met.

4. The computer program product of claim 3, wherein the one or more escalation criteria comprise one or more keywords associated with fraudulent activity.

5. The computer program product of claim 1, wherein the dedicated communication channel is a dedicated telephone number.

6. The computer program product of claim 1, wherein the dedicated communication channel is an Application Programming Interface.

7. The computer program product of claim 1, wherein the customer care computer system is caused to determine that the automated system is unable to fulfill the request based on the request being directed to non-automated service stored in a non-automated service database.

8. The computer program product of claim 7, wherein the non-automated service database is accessible by the computing device.

9. The computer program product of claim 1, wherein the customer care computer system is further caused to generate an avatar corresponding that presents the service in the second human-spoken language.

10. A method comprising:

establishing, with a processor, a first human-spoken language for a customer care computer system;

receiving, at an automated system of the customer care computer system, a request from a user through a dedicated communication channel for a service, the request being in a second human-spoken language, the automated system being dependent on an automated service database;

determining, with the processor, an identity of the second human-spoken language based on the dedicated communication channel;

determining, with a processor, that the automated system is unable to fulfill the request; and transitioning, with the processor based on the automated system being unable to fulfill the request, the request from the automated system to a simulated live agent engine of the customer care computer system that generates a simulated live agent session independently of the automated service database, the simulated live agent engine sending the request to a machine interpreter that translates the request into the first human-spoken language, the machine interpreter sending the translated request to a computing device, operably by a human customer agent, that processes the request to provide the service in the first human-spoken language, the machine interpreter translating the service into the second human-spoken language, the simulated live agent engine delivering the service in the second human-spoken language to the user, the second human-spoken language being distinct from the first human-spoken language.

11. The method of claim 10, further comprising monitoring the simulated live agent session for one or more escalation criteria.

12. The method of claim 11, further comprising transitioning the request to a human language interpreter upon at least one of the one or more escalation criteria being met.

13. The method of claim 12, wherein the one or more escalation criteria comprise one or more keywords associated with fraudulent activity.

14. The method of claim 10, wherein the dedicated communication channel is a dedicated telephone number.

15. The method of claim 10, wherein the dedicated communication channel is an Application Programming Interface.

16. The method of claim 10, further comprising determining that the automated system is unable to fulfill the request based on the request being directed to a non-automated service stored in a non-automated service database.

17. The method of claim 16, wherein the non-automated service database is accessible by the computing device.

18. The method of claim 10, wherein the computer is further caused to generate an avatar corresponding that presents the service in the second human-spoken language.

19. A system comprising:
   a customer care computer system that is based on a first human-spoken language;
   an automated system of the customer care computer system that receives a request from a user through a dedicated communication channel for a service from the customer care computer system, the request being in a second human-spoken language, the automated system being dependent on an automated service database; and
   a processor that determines an identity of the second human-spoken language based on the dedicated communication channel, determines that the automated system is unable to fulfill the request, and transitions, based on the automated system being unable to fulfill the request, the request from the automated system to a simulated live agent engine of the customer care computer system that generates a simulated live agent session independently of the automated service database, the simulated live agent engine sending the request to a machine interpreter that translates the request into the first human-spoken language, the machine interpreter sending the translated request to a computing device, operably by a human customer agent, that processes the request to provide the service in the first human-spoken language, the machine interpreter translating the service into the second human-spoken language, the simulated live agent engine delivering the service in the second human-spoken language to the user, the second human-spoken language being distinct from the first human-spoken language.

20. The system of claim 19, further comprising an automated system database in operable communication with the automated system and a non-automated system database in operable communication with the computing device, the processor determining that the automated system is unable to fulfill the request based on the request being directed to a non-automated service stored in a non-automated service database.

* * * * *